(12) United States Patent
Matsuo (10) Patent No.: US 8,141,576 B2
(45) Date of Patent: Mar. 27, 2012

(54) FLOAT VALVE DEVICE

(75) Inventor: Shinichi Matsuo, Yokohama (JP)

(73) Assignee: Piolax Inc., Yokohama-Shi (JP)

( * ) Notice: Subject to any disclaimer, the term of this patent is extended or adjusted under 35 U.S.C. 154(b) by 435 days.

(21) Appl. No.: 12/351,062

(22) Filed: Jan. 9, 2009

(65) Prior Publication Data

US 2009/0178719 A1    Jul. 16, 2009

(30) Foreign Application Priority Data

Jan. 10, 2008    (JP) ................................. 2008-003486

(51) Int. Cl.
*F16K 24/04* (2006.01)
(52) U.S. Cl. ........................................ 137/202; 137/43
(58) Field of Classification Search .................... 137/39, 137/43, 202, 587, 422; 251/77, 84
See application file for complete search history.

(56) References Cited

U.S. PATENT DOCUMENTS

| 5,755,252 | A | * | 5/1998 | Bergsma et al. | ............... | 137/202 |
|---|---|---|---|---|---|---|
| 5,950,659 | A | * | 9/1999 | Szlaga et al. | ................... | 137/202 |
| 6,371,146 | B1 | * | 4/2002 | Benjey | ........................... | 137/202 |
| 6,691,725 | B2 | * | 2/2004 | Zorine | ........................... | 137/202 |
| 6,941,966 | B2 | * | 9/2005 | Mori et al. | ..................... | 137/202 |
| 7,717,126 | B2 | * | 5/2010 | Tagami et al. | ................... | 137/43 |
| 7,770,594 | B2 | * | 8/2010 | Kishi | ............................ | 137/202 |
| 2003/0098063 | A1 | * | 5/2003 | Mori et al. | ..................... | 137/202 |
| 2003/0111111 | A1 | * | 6/2003 | Zorine | ........................... | 137/202 |

FOREIGN PATENT DOCUMENTS

JP         07-279789 A    10/1995

* cited by examiner

*Primary Examiner* — Craig Schneider
*Assistant Examiner* — Craig J Price
(74) *Attorney, Agent, or Firm* — Holtz, Holtz, Goodman & Chick, PC (57) ABSTRACT

Provided is a float valve device which allows a valve to be quickly opened when, in a state in which a float has been raised as a result of a rise in fuel liquid level to close the valve, the fuel liquid level is lowered again. The float valve device includes a housing, a float accommodated in the housing, a movable valve adapted to abut a valve seat to close an opening, and a retention frame to retain the movable valve so as to allow the movable valve to ascend/descend by a predetermined distance and to incline with respect to the float. Further, a circumferentially uneven protrusion is formed on a portion where the retention frame and the movable valve abut each other. When the float is lowered in a valve-closed state, the protrusion first abuts the movable valve to impart a lowering force thereto.

4 Claims, 12 Drawing Sheets

FLOAT VALVE DEVICE

BACKGROUND OF THE INVENTION

1. Field of the Invention

The present invention relates to a float valve device in which a float rises within a housing when a liquid level rises and in which an opening communicating with an exterior is closed when the liquid level has attained a predetermined height, and more particularly, to a valve device suitable as a float valve device which allows fuel vapor in a fuel tank of an automobile to escape to a canister, which, when a fuel liquid level exceeds a predetermined value, closes an opening so as to prevent fuel from flowing to an outside, and which performs a full-tank regulation at the time of fuel supply.

2. Description of the Related Art

For example, inside the fuel tank of an automobile, there is arranged a float valve device which allows fuel vapor to escape to a canister arranged outside to thereby prevent an increase in tank inner pressure, which closes an opening communicating with the canister when the fuel liquid level exceeds a predetermined height, to thereby prevent fuel from flowing to an outside, and which performs a full-tank regulation at the time of fuel supply.

As an example of the float valve device described above, Japanese Patent Application Laid-open No. Hei 07-279789 discloses a liquid level control valve including: a seat portion (corresponding to valve seat) including a first flat surface portion arranged at an opening of a fuel tank communicating with one end of a passage which communicates with a canister at the other end thereof; a valve member including a first flat surface portion held in contact with the flat surface portion of the seat portion; and a float floating within the fuel tank due to a buoyancy of the fuel and adapted to make the seat portion abut the valve member so as to close the opening by upwardly pressing the valve member with a top portion thereof in response to a rise in the fuel liquid level. Further, the valve member is engaged with the float so as to be capable of relative movement, and the top portion of the float is formed by a protrusion including a three-dimensional curved surface formed at a center of an upper portion of the float.

When the float rises due to the rise in the fuel liquid level, the top portion of the float presses the valve member upwardly and brings the valve member into contact with the seat portion to thereby close the opening. Because the valve member is capable of relative movement with respect to the float, if, at some circumstances, an attitude of the float is inclined with respect to the opening due to inclination of a vehicle or the like, the attitude of the valve member is corrected as appropriate, and the valve member is firmly held in contact with the seat portion over an entire periphery of the seat portion, thereby closing the opening.

In the float valve device constructed as disclosed in Japanese Patent Application Laid-open No. Hei 07-279789, when the fuel liquid level once risen is lowered, the buoyancy applied to the float is reduced, and hence the float descends due to its own weight to return to an original position, and the opening is opened again.

However, in a state in which the opening is closed with high air tightness by the valve member arranged on the upper portion of the float, the inner pressure of the fuel tank is applied as a force for pushing up the valve member, and hence even when the fuel liquid level is lowered and the buoyancy applied to the float is reduced to thereby attain a state in which the opening ought to be opened due to the weight of the float itself, the valve member may sometimes remain attached to the opening, keeping the opening closed. If opening of the valve upon lowering of the fuel liquid level is not thus effected with satisfactory responsiveness, there is a risk of a vapor pressure within the fuel tank being excessively increased, even temporarily, which is not desirable.

SUMMARY OF THE INVENTION

It is accordingly an object of the present invention to provide a float valve device in which, when, with the opening being closed by the valve due to the rise of the float caused by the rise once in fuel liquid level, the fuel liquid level is lowered again, the valve is quickly separated from the opening to thereby effect valve opening even if the inner pressure of the fuel tank is relatively high.

In order to achieve the above-mentioned object, according to a first aspect of the present invention, there is provided a float valve device, including: a housing which is generally cylindrical and which is divided into a lower space and an upper space by a partition wall, a ventilation pipe which allows the upper space to communicate with an exterior being mounted to an outer wall of the upper space, the partition wall being provided with an opening whose lower surface has a valve seat, a communication hole which allows the lower space to communicate with the exterior being formed on an outer wall of the lower space; a float which is arranged in the lower space of the housing so as to be vertically slidable and adapted to be raised by a liquid flowing in through the communication hole of the housing; a movable valve which is rockably supported on an upper portion of the float and adapted to abut the valve seat to close the opening when the float is raised to a predetermined height; and a retention frame which is formed as a frame surrounding an outer periphery of the movable valve and attached to the outer periphery of the upper portion of the float to retain the movable valve so as to allow the movable valve to ascend/descend by a predetermined distance and to incline with respect to the float, in which a circumferentially uneven protrusion is formed on an abutment portion where the retention frame, which restricts an ascent/descent height of the movable valve with respect to the float, and the movable valve abut each other, and in which the protrusion imparts a lowering force to the movable valve on its abutment when the float descends in a valve-closed state.

According to the present invention described above, in a state in which the float valve device is mounted, for example, to a fuel tank, if fuel in the fuel tank is shaken to cause a fuel liquid level in the fuel tank to rise, the float rises, and the movable valve arranged on the upper portion of the float is pressed by the float with its protrusion portion to thereby be brought into contact with the valve seat. As a result, the opening is closed, and leakage of the fuel to the exterior is prevented.

Further, when the fuel liquid level is lowered as a result, for example, of subsiding of the shaking of the fuel, buoyancy applied to the float is reduced, and hence the float tends to descend due to its own weight. At this stage, the protrusion, which is formed at the abutment portion where the retention frame which regulates the ascent/descent height of the movable valve with respect to the float and the movable valve abut each other, imparts a lowering force to the moveable valve on its abutment, and hence there is imparted to the movable valve a circumferentially uneven lowering force. As a result, a separating force is concentrated on a certain portion in circumferential direction, and hence, as compared with a case in which the movable valve is lowered straight to separate it from the valve seat, the movable valve can be separated from the valve seat with a smaller force. As a result, it is possible to maintain a pressure for re-opening of the valve (pressure in the fuel tank allowing re-opening of the valve when buoyancy ceases to be applied to the float in a valve-closed state) high; therefore, it is possible to achieve an improvement in responsiveness in valve opening/closing.

According to a second aspect of the present invention, in the first aspect of the present invention, there is provided a float valve device, in which a height of the protrusion, which is formed on the abutment portion where the retention frame, which restricts the ascent/descent height of the movable valve with respect to the float, and the movable valve abut each other, is set such that the retention frame and the movable valve abut each other solely with the protrusion even in a state in which the float is inclined to a maximum degree with respect to the movable valve.

When the float tends to descend in the valve-closed state, the retention frame and the movable valve abut at the protrusion, and there is exerted a force separating the movable valve from the opening. If the float can be sufficiently inclined with respect to the movable valve, even a portion of the float for which no protrusion is provided (e.g., portion opposed to the protrusion in the circumferential direction) may be brought into contact with the movable valve. In that case, the force separating the movable valve from the valve seat is exerted at least at two positions, and hence the separating force is circumferentially divided, which means the separation may not be performed efficiently. In the above-mentioned construction, however, even in a state in which the float is inclined to the maximum degree with respect to the movable valve, it is possible to maintain the state in which the retention frame and the movable valve abut each other solely with the protrusion, and hence it is possible to concentrate the separating force on a certain portion in circumferential direction, making it possible to reliably separate the movable valve from the valve seat.

In the float valve device of the present invention, when the fuel liquid level is lowered as a result, for example, of the subsiding of the shaking of the fuel, no more buoyancy is applied to the float, and hence the float tends to descend due to its own weight. At this stage, the protrusion, which is formed at the portion where the retention frame which regulates the ascent/descent height of the movable valve with respect to the float and the movable valve abut each other, first imparts a lowering force to the moveable valve on its abutment, and hence a circumferentially uneven lowering force is imparted to the movable valve. As a result, the separating force is concentrated on a certain portion in circumferential direction, and hence, as compared with the case in which the movable valve is separated from the valve seat by lowering it straight, the movable valve can be separated from the valve seat with a smaller force, making it possible to achieve an improvement in responsiveness in valve opening/closing.

BRIEF DESCRIPTION OF THE DRAWINGS

In the accompanying drawings:

FIGS. 4A-4C illustrate a movable valve of the float valve device, of which

FIGS. 5A-5C illustrate the movable valve of the float valve device, of which

DETAILED DESCRIPTION OF THE PREFERRED EMBODIMENTS

In the following, a float valve device according to an embodiment of the present invention is described with reference to the drawings. A float valve device 10 according to this embodiment is arranged inside an automotive fuel tank. The float valve device 10 allows fuel vapor in the fuel tank to escape to a canister, and, when a fuel liquid level exceeds a predetermined value, closes an opening so as to prevent fuel from flowing to an outside. Further, at the time of fuel supply, the float valve device 10 performs full-tank regulation.

Figure 1:
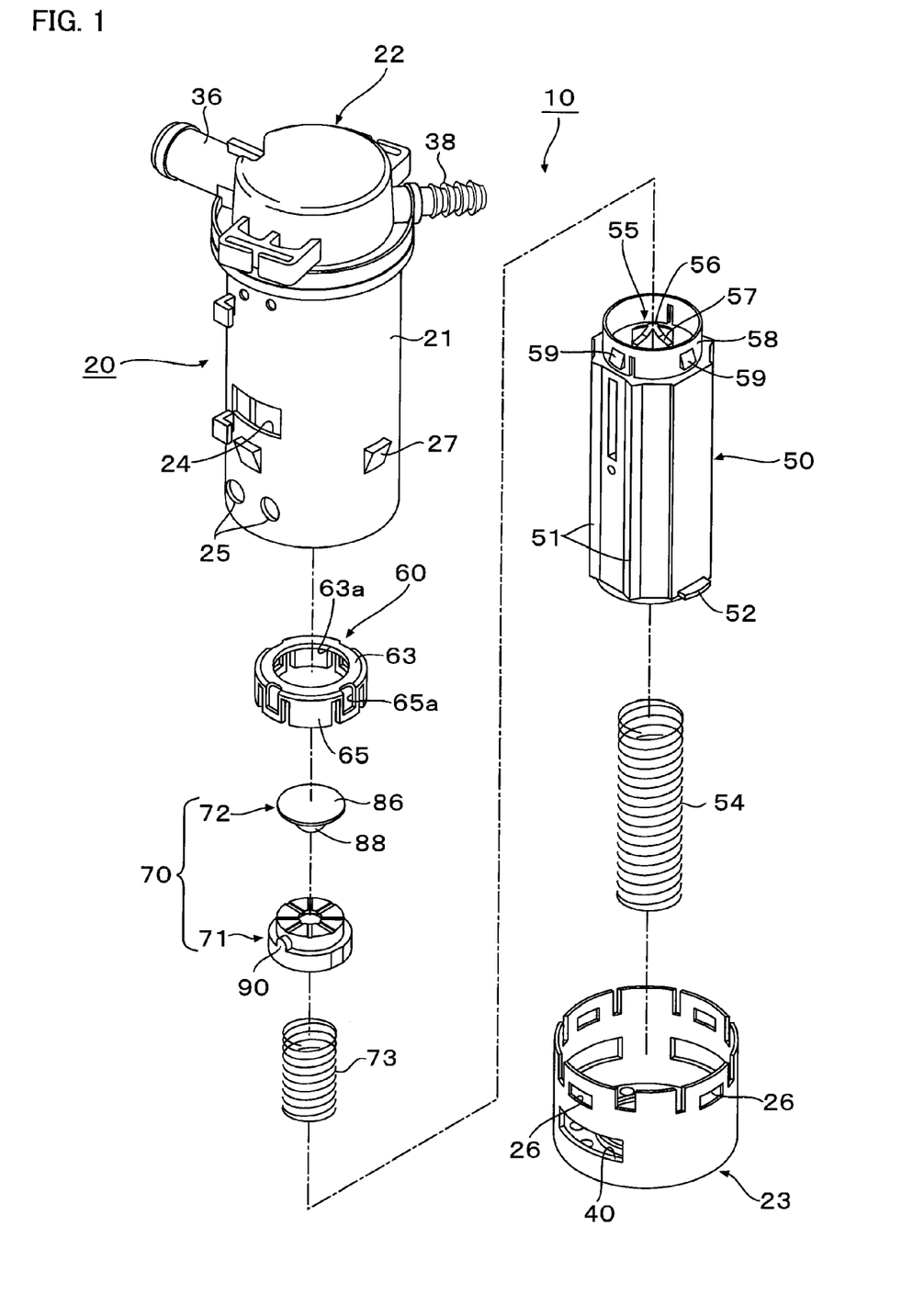
FIG. 1 is an exploded perspective view of a float valve device according to an embodiment of the present invention.

As illustrated in FIG. 1, the float valve device 10 includes a generally cylindrical housing 20, a float 50 arranged within the housing 20 so as to be vertically slidable, and a movable valve 70 mounted to an upper portion of the float 50 so as to be capable of relative movement.

The housing 20 includes a substantially cylindrical housing main body 21 with a closed upper surface, an upper cap 22 welded to the upper surface of the housing main body 21, and a lower cap 23 fit-engaged with a lower surface of the housing main body 21.

The housing main body 21 includes rectangular communication holes 24 substantially in the middle of an outer peripheral wall 28 thereof, and circular communication holes 25 formed in a lower portion of the outer peripheral wall 28. Further, on the lower portion of the outer peripheral wall 28, there are formed engagement claws 27 to be fit-engaged with engagement holes 26 of the lower cap 23.

Figure 2:
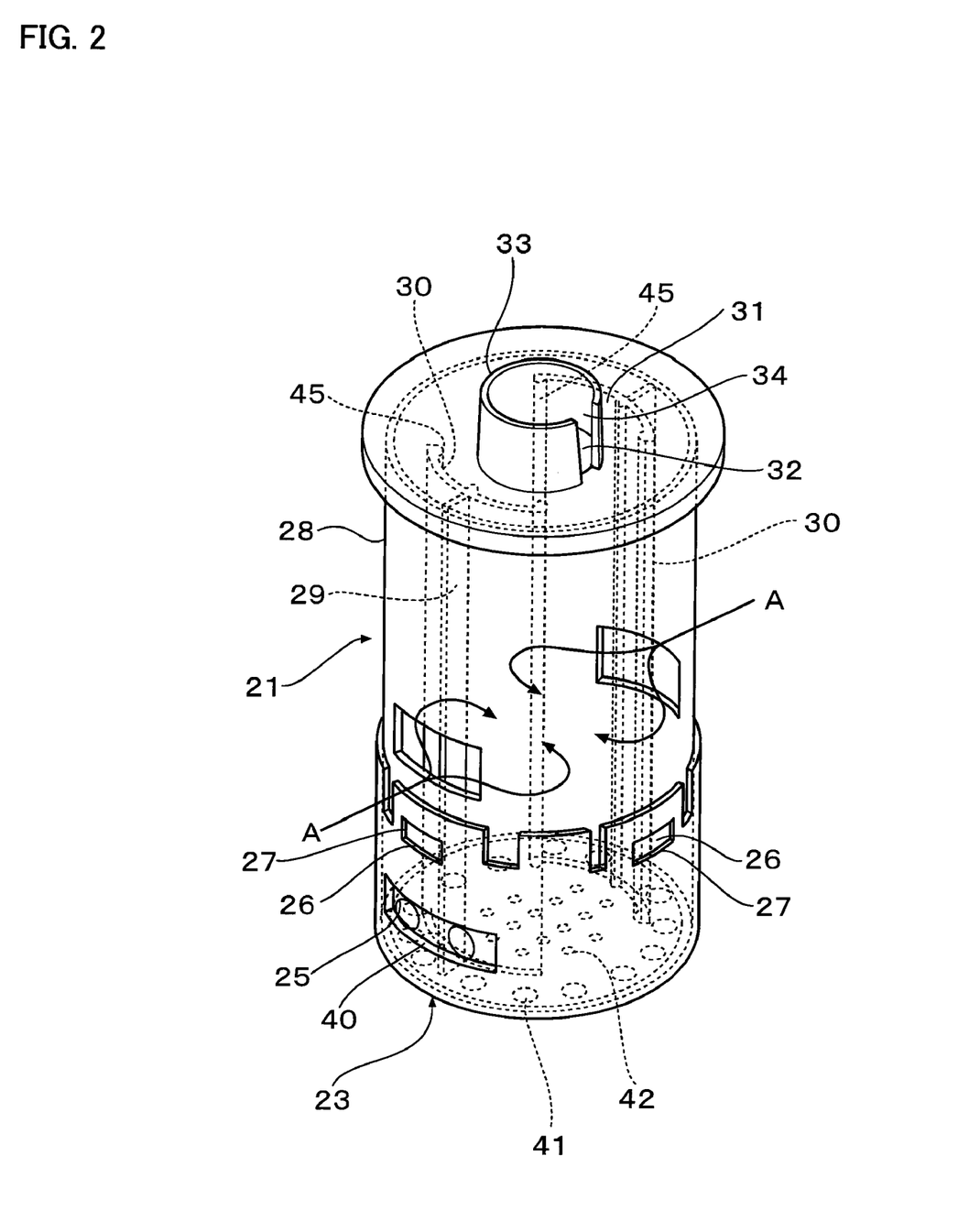
FIG. 2 is a perspective view of a housing main body and a lower cap of the float valve device.

As illustrated in FIG. 2, inside the outer peripheral wall 28, through an intermediation of rib-like connection walls 29 extending in a cylinder-axis direction, there is arranged a pair of inner walls 30 with an arcuate cross-sectional configuration circumferentially opposed to each other. A space between the inner walls 30 constitutes a gap through which the fuel flows in and out. With this construction, as indicated by an arrow A of FIG. 2, the fuel passes through the communication holes 24, and gets around outer peripheral sides of the inner walls 30 before flowing into the housing main body 21.

Figure 3:
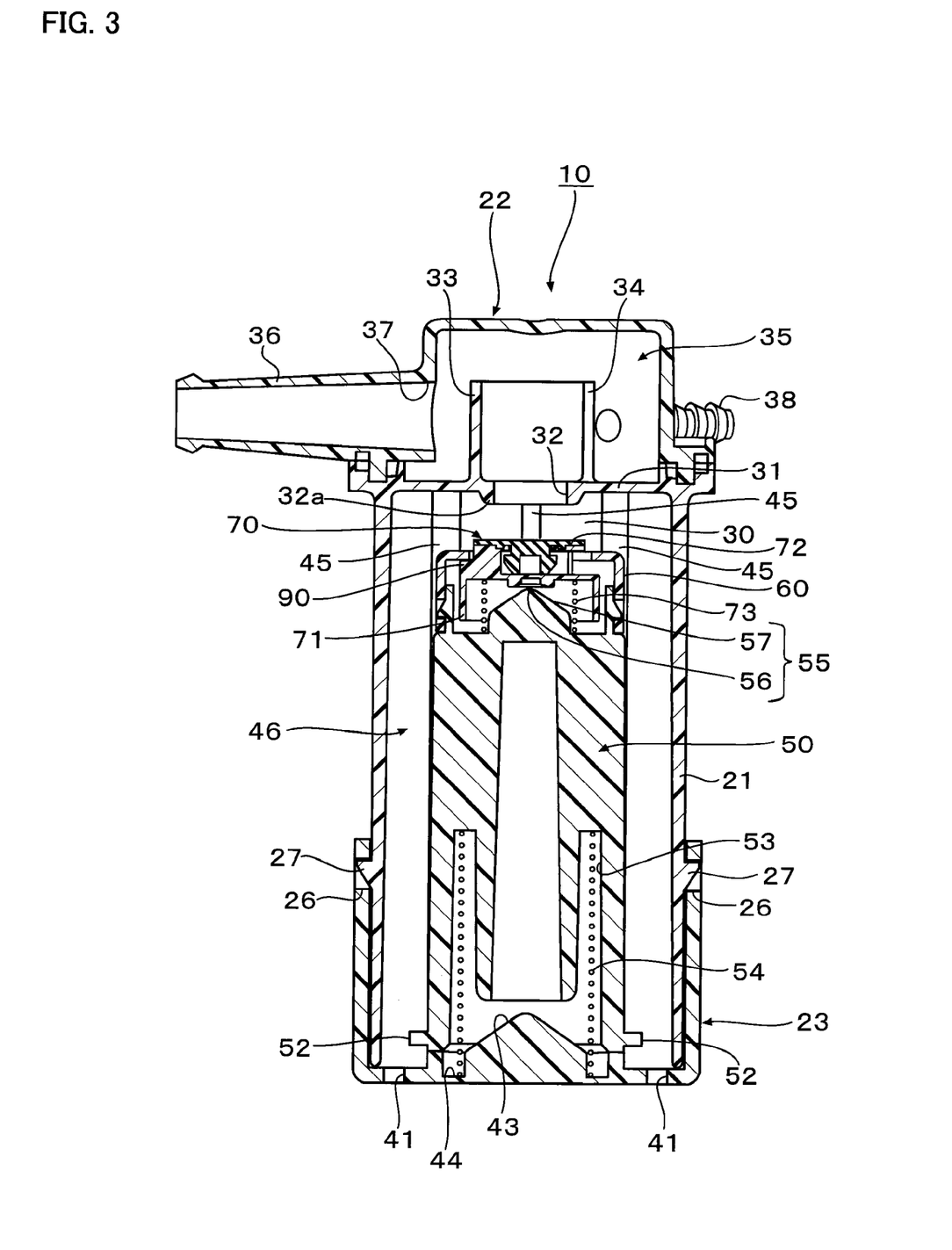
FIG. 3 is a longitudinal sectional view of the float valve device.

Referring also to FIG. 3, the inner walls 30 includes on inner peripheral surfaces thereof a plurality of ribs 45 extending in parallel to each other in the cylinder-axis direction. The vertical sliding of the float 50 is guided by those ribs. Further, the ribs 45 constitute portions coming into contact with the outer peripheral surface of the float 50 when the float 50 is inclined, whereby the maximum inclination angle of the float 50 is regulated. This regulation is described below along with a valve opening structure of the float 50.

The upper surface of the housing main body 21 is closed by a partition wall 31, and an opening 32 is formed at the center of the partition wall 31. The opening 32 is a portion establishing communication between a lower space 46, which is surrounded by the housing main body 21 and the lower cap 23, and an upper space 35, which is surrounded by the partition wall 31 of the housing main body 21 and the upper cap 22. An annularly protruding valve seat 32a is formed at a lower peripheral edge of the opening 32. Further, a cylindrical partition 33 is protruded at the peripheral edge of the opening of the upper surface of the partition wall 31, and the partition 33 includes a cutout 34 formed at a position opposed to a ventilation hole 37 described below. When the float 50 rises abruptly and fuel rushes out of the opening 32, the partition 33 serves to prevent the fuel from directly entering a ventilation pipe 36 through the ventilation hole 37.

The upper cap 22 is welded onto the partition wall 31 of the housing main body 21. Integrally with the upper cap 22, there is formed the ventilation pipe 36 which connects to piping (not shown) to thereby communicate with a canister arranged outside the fuel tank. A proximal end opening of the ventilation pipe 36 constitutes the ventilation hole 37 communicating with the upper space 35.

Further, on the upper cap 22, a communication pipe 38 that is allowed through piping (not shown) to communicate with a cutoff valve (not shown) through a pressure adjustment valve is formed. However, the cutoff valve can also adopt a structure to independently communicate with the outside of the fuel tank through the pressure adjustment valve, and in this case, it is not necessary to provide the communication pipe 38. The cutoff valve discharges the fuel vapor and the like in the fuel tank to the outside thereof through the pressure adjustment valve when a pressure in the fuel tank increases to a predetermined value or more even after the opening 32 is closed by the float valve device 10. In addition, when the liquid level of the fuel further rises, the cutoff valve closes an opening thereof to the pressure adjustment valve, and inhibits the fuel from flowing outside.

The float 50 is substantially cylindrical, and includes in its outer periphery a plurality of ribs 51 extending in the cylinder-axis direction. Due to the ribs 51, the float 50 is held between the inner walls 30 of the housing main body 21 so as to be vertically slidable. On an outer periphery of a lower end portion of the float 50, a pair of protrusions 52 (see FIG. 1) is formed so as to be opposed to each other in the circumferential direction. Those protrusions 52 are inserted into the gap between the inner walls 30, and regulate rotation of the float 50.

As illustrated in FIG. 3, an annular recess 53 is formed in the bottom surface of the float 50, and a float spring 54 is inserted into the recess 53. The lower end portion of the float spring 54 is inserted into a reception groove 44 formed in the outer periphery of a protrusion 43 of a lower cap 23, and is retained therein. The float spring 54 imparts an upward urging force to the float 50, and when the float 50 is immersed in the fuel by a predetermined volume, the float spring 54 serves to raise the float 50 synergistically with the buoyancy thereof.

A protrusion 55 is formed at the center of the upper surface of the float 50. The protrusion 55 includes an apex portion 56 arranged at the center, and a peripheral portion 57 gradually lowered as the peripheral portion 57 extends from the apex portion 56 toward the outer periphery. As illustrated in FIG. 1, the protrusion 55 of this embodiment is formed by a plurality of ribs, and formed into a shape having the peripheral portion 57 in which the longitudinal cross sections of the respective ribs are lowered toward the outer periphery from the apex portion 56 as described above. It is also possible for the protrusion 55 to be, for example, of a conical or a spherical configuration. The protrusion 55 may be formed by a plurality of ribs radially extending from the apex portion 56.

An annular rib 58 is formed in the outer periphery of the protrusion 55 on the upper surface of the float 50. The annular rib 58 accommodates a movable valve 70 described below so as to allow the movable valve 70 to slide vertically. In the outer periphery of the annular rib 58, there are formed a plurality of engagement claws 59 to be engaged with engagement holes 65a of a retention frame 60 described below (see FIG. 1).

Figure 7:
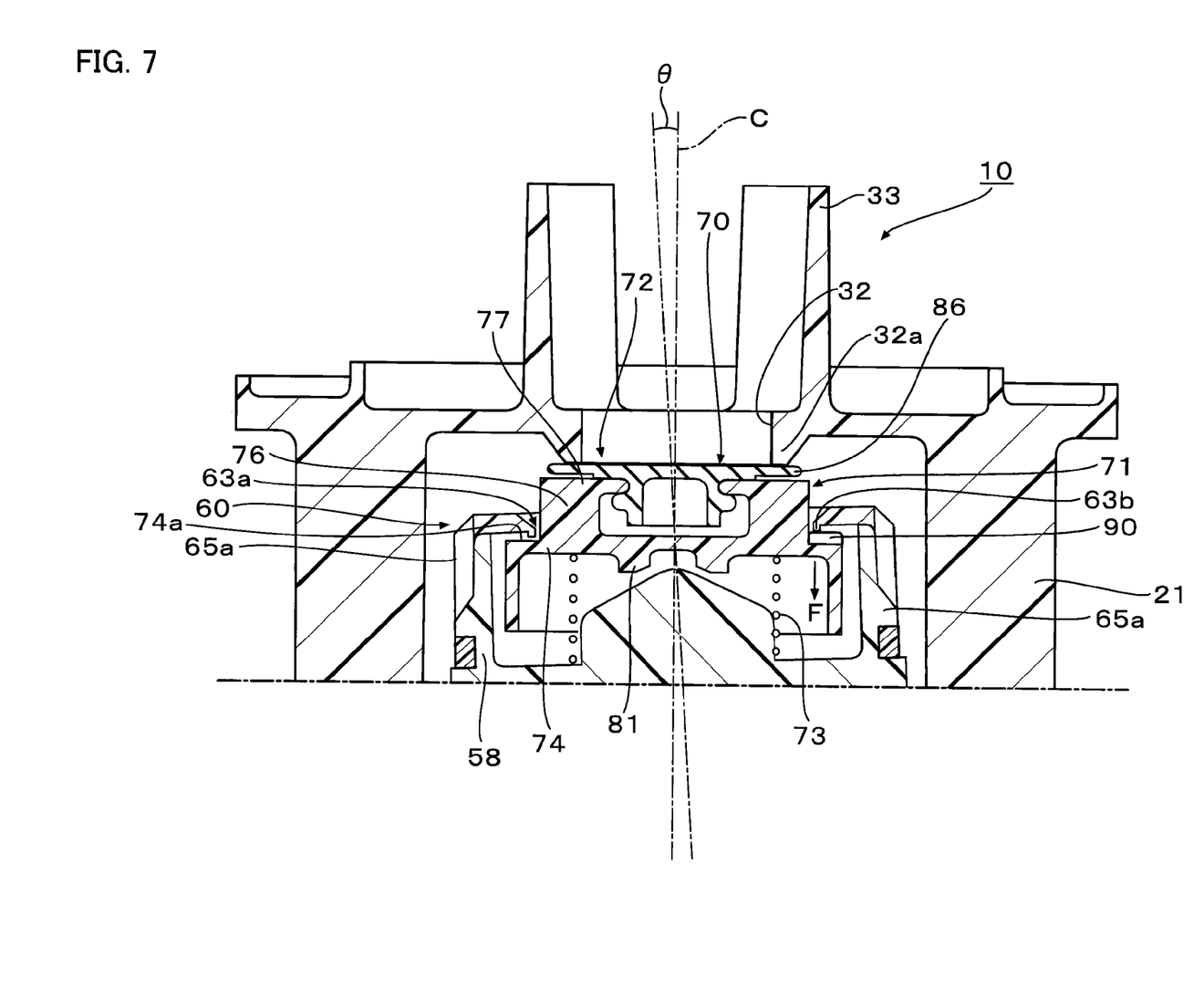
FIG. 7 is a partially enlarged sectional view illustrating how, in the float valve device, the float descends in a valve-closed state to separate the movable valve from the valve seat.

Further, surrounding the outer periphery of the movable valve 70, the retention frame 60, which is formed as a frame to serve to retain the movable valve 70 and allow the movable valve 70 to ascend/descend by a predetermined distance and to incline with respect to the float 50, is attached to the outer periphery of the annular rib 58. The retention frame 60 is formed as a frame including a circular plate member 63 having a circular opening 63a, and a peripheral wall 65 extending downwardly from the peripheral edge of the plate member 63. In the outer periphery of the peripheral wall 65, there are formed engagement holes 65a to be engaged with the engagement claws 59. Further, as illustrated in FIG. 7, an annular abutment portion 63b of a predetermined height protrudes from the inner side peripheral edge of the opening 63a of the plate member 63. The annular abutment portion 63b constitutes a portion that abuts a protrusion 90 described below.

Figure 6:
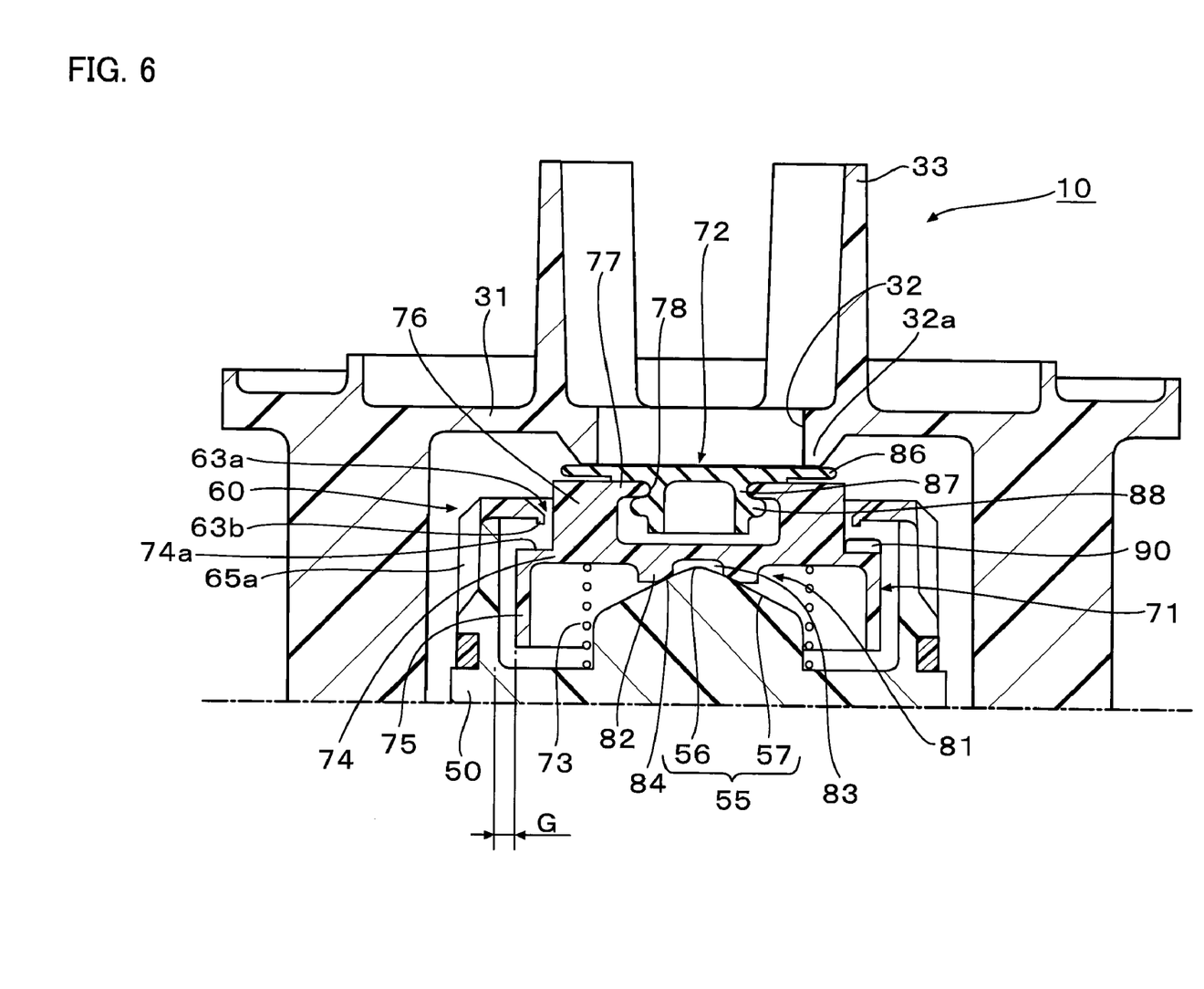
FIG. 6 is a partially enlarged sectional view illustrating how, in the float valve device, a float rises and a valve seat is closed by the movable valve.

As illustrated in FIG. 6, between the outer periphery of the movable valve 70 and the inner periphery of the annular rib 58, there is formed a predetermined gap G, with the movable valve 70 being arranged at the center of the annular rib 58. The gap G is larger than the gaps between the outer periphery of the float 50 and the inner periphery of the inner walls 30. Even if the float 50 moves laterally within the inner walls 30, it is possible for the movable valve 70 to make a still greater lateral movement.

On the upper portion of the protrusion 55, there is rockably supported the movable valve 70 which, when the float 50 floats to a predetermined height, abuts the valve seat 32a to close the opening 32. The movable valve 70 is described with reference to FIGS. 1, 4, and 5.

Figure 4A:
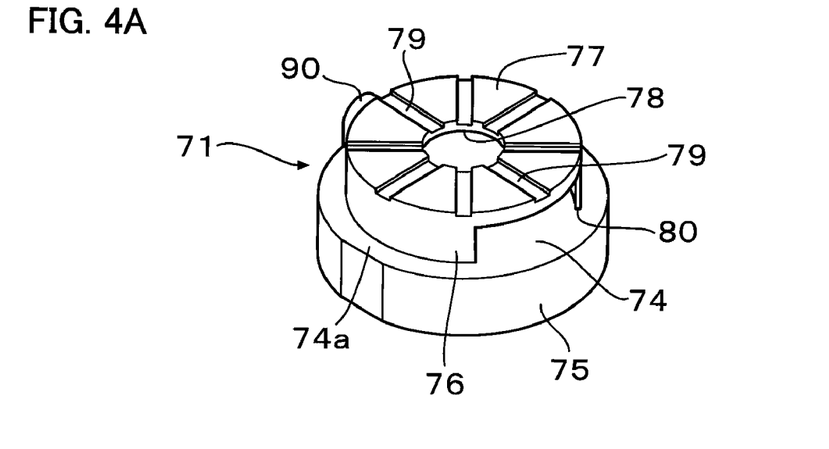
FIG. 4A is a perspective view of a main body thereof.
Figure 4B:
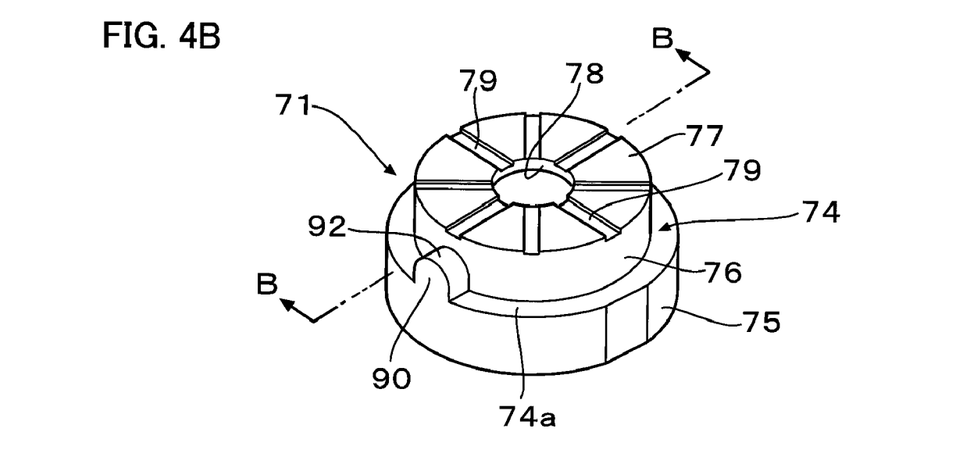
FIG. 4B is a perspective view of the main body as seen from a different direction from that of FIG. 4A.
Figure 4C:
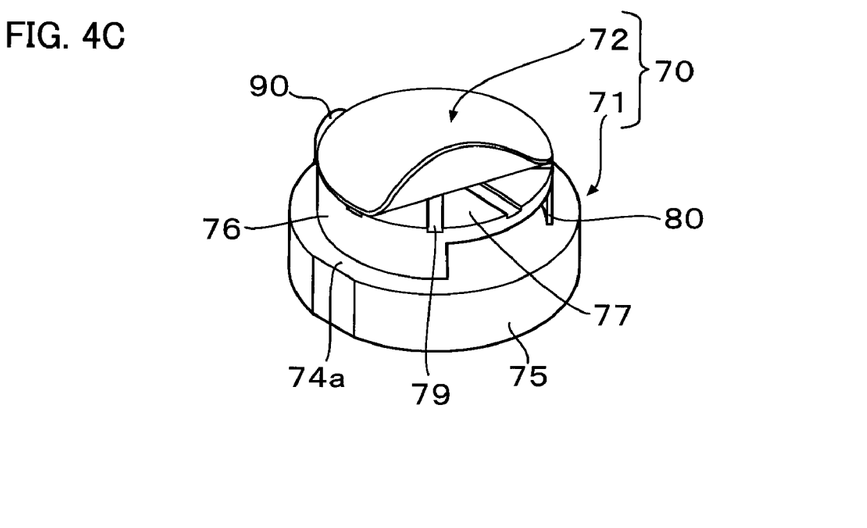
FIG. 4C is a perspective view of the main body with a valve member attached thereto.
Figure 5A:
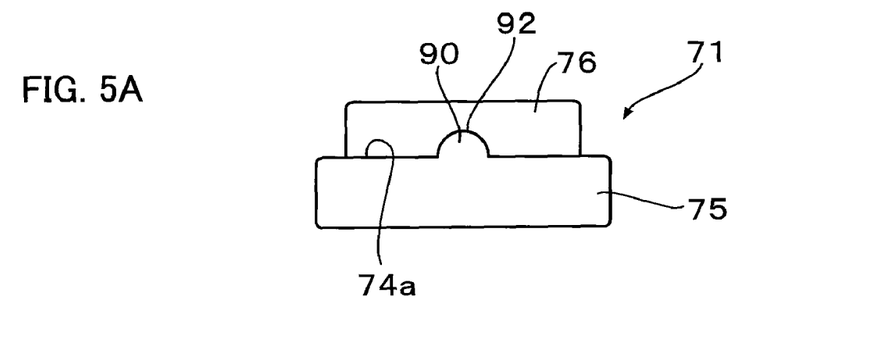
FIG. 5A is a front view of the main body thereof.
Figure 5B:
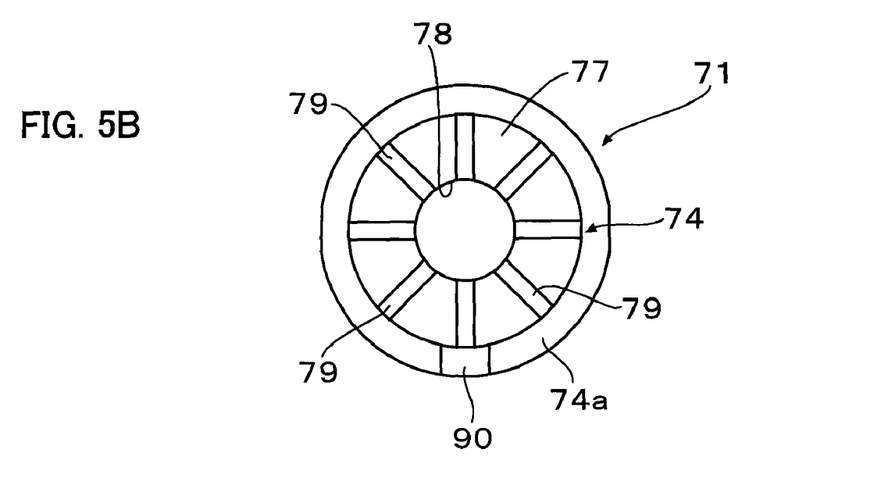
FIG. 5B is a plan view of the main body.
Figure 5C:
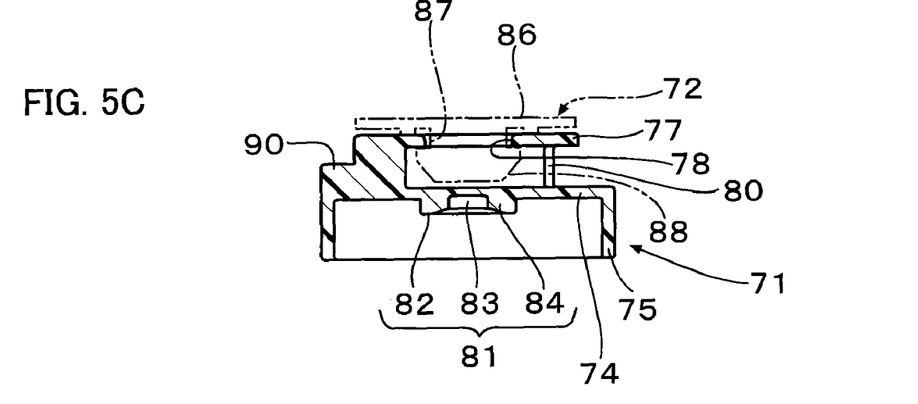
FIG. 5C is a sectional view taken along an arrow line B-B of FIG. 4B.

As illustrated in FIG. 1, the movable valve 70 includes a main body 71 and a valve member 72 attached to the upper portion of the main body 71. As illustrated in FIGS. 4 and 5, the main body 71 includes a substantially circular plate portion 74, a cylindrical peripheral wall 75 extending downwardly from the peripheral edge of the plate portion 74, a cylindrical rib 76 having an outer diameter smaller than that of the peripheral wall 75 and extending upwardly from the upper surface of the plate portion 74, and an upper plate portion 77 connected to the upper opening of the cylindrical rib 76.

At the center of the upper plate portion 77, there is formed a mounting hole 78 for attaching the valve member 72, and ventilation grooves 79 are formed to extend radially from the mounting hole 78 toward the outer periphery. The ventilation grooves 79 allow air to enter a space between the valve member 72 and the upper plate portion 77, and prevent the valve member 72 from sticking to the upper plate portion 77 in the case where the valve is opening. As illustrated in FIG. 4C, the valve member 72 curls up to enable the valve to be opened smoothly. Further, as illustrated in FIG. 4A, the cylindrical rib 76 includes a cavity 80 extending circumferentially in a predetermined width, and the cavity contributes to imparting flexibility between the plate portion 74 and the upper plate portion 77.

As illustrated in FIG. 5C, at the center of the lower surface of the plate portion 74, there is formed a receiving portion 81 against which the protrusion 55 of the float 50 abuts such that the movable valve 70 can be rockably supported. At the center of the receiving portion 81, there is formed a center hole 83. Further, there is formed a guide recess 84 gradually reduced in depth as it extends toward the outer periphery from the center hole 83.

The valve member 72 attached to the main body 71 is formed of an elastic material such a synthetic rubber. As illustrated in FIGS. 3 and 5C, the valve member 72 includes a flange portion 86, a shaft portion 87 extending from the center of the lower surface of the flange portion 86, and an engagement protrusion 88 diverged at the forward end portion of the shaft portion 87. The valve member 72 is attached onto the upper plate portion 77 by forcing the engagement protrusion 88 into a mounting hole 78 of the upper plate portion 77 and engaging the same with the back side of the mounting hole 78.

The movable valve 70 is urged upwardly by a valve body spring 73, and a cylindrical rib 76, the upper plate portion 77, and the valve member 72 protrude upwardly from the opening 63a of the retention frame 60. The movable valve 70 may not be provided with the valve body spring 73 and not be urged upwardly.

The movable valve 70 is inserted into the annular rib 58, with the valve body spring 73 being arranged in the outer periphery of the protrusion 55, whereby the movable valve 70 is rockably accommodated in and supported by the upper portion of the protrusion 55 via the receiving portion 81. In this state, the retention frame 60 is fit-engaged onto the outer periphery of the annular rib 58 for covering, whereby the cylindrical rib 76, the upper plate portion 77, and the valve member 72 are led to upwardly protrude from the opening 63a, and the movable valve 70 is constantly urged upwards. At the same time, the movable valve 70 is retained so as to be vertically slidable and laterally rockable. It is not always necessary to upwardly urge the movable valve 70, and hence there may be no need to arrange the valve body spring 73.

In this way, the outer periphery of the movable valve 70 is surrounded by the retention frame 60, with the movable valve being retained in the annular rib 58 so as to be capable of ascending/descending and inclination. Further, when the movable valve 70 ascends by a predetermined distance with respect to the retention frame 60, the movable valve 70 abuts the retention frame 60, and the movement of the movable valve 70 is restricted.

Further, in this embodiment, a protrusion 90 of a predetermined height is formed at a certain portion in circumferential direction on the upper surface side of the outer periphery 74a of the movable valve 70, which constitutes the portion where the movable valve 70 and the retention frame 60 abut each other. As illustrated in FIG. 5A, the outer periphery 92 of the protrusion 90 is formed as a curved surface of a predetermined curvature (in this embodiment, semi-columnar). When the movable valve 70 rises with respect to the retention frame 60, the protrusion 90 abuts the annular abutment portion 63b of the retention frame 60.

Next, the operation of the float valve device 10 is described.

In the state in which the liquid level of the fuel in the fuel tank is low and in which the float 50 is not immersed in the fuel by a predetermined volume or more, the valve member 72 of the movable valve 70 does not abut the valve seat 32a as illustrated in FIG. 3, and the opening 32 is kept open. Thus, the fuel vapor in the fuel tank enters the lower space 46 through the communication holes 24, 25, 41, and 42 of the housing 20 before passing the opening 32. Then, the fuel vapor enters the upper space 35, and enters the ventilation pipe 36 through the ventilation hole 37 before being sent to the canister arranged outside the fuel tank through piping (not shown).

Next, when the liquid level of the fuel in the fuel tank is raised, and the float 50 is immersed in the fuel by a predetermined volume or more, by the buoyancy applied to the float 50 as well as the urging force of the float spring 54, the float 50 rises as illustrated in FIG. 6 to compress the valve body spring 73, and the valve member 72 of the movable valve 70 abuts the valve seat 32a. Further, the protrusion 55 of the float 50 presses the receiving portion 81 of the movable valve 70, and brings the flange portion 86 of the valve member 72 into intimate contact with the valve seat 32a, thereby closing the opening 32. At this stage, the periphery of the protrusion 55 of the float 50 abuts the center hole 83 of the receiving portion 81 of the movable valve 70 to raise the movable valve 70.

As a result, in a case in which the fuel is greatly shaken, for example, due to turning of the automobile to raise the liquid level, the opening 32 is closed so as to prevent the fuel from flowing into the upper space 35. When, at the time of fuel supply, the liquid level is raised to a predetermined height, the opening 32 is closed to raise the tank inner pressure, thereby stopping the fuel supply to effect full-tank regulation.

When the shaking of the fuel has subsided or when the fuel in the fuel tank has been consumed to cause the liquid level of the fuel in the fuel tank to be lowered, no more buoyancy is applied to the float 50, and hence the float 50 descends due to its own weight.

Figure 8:
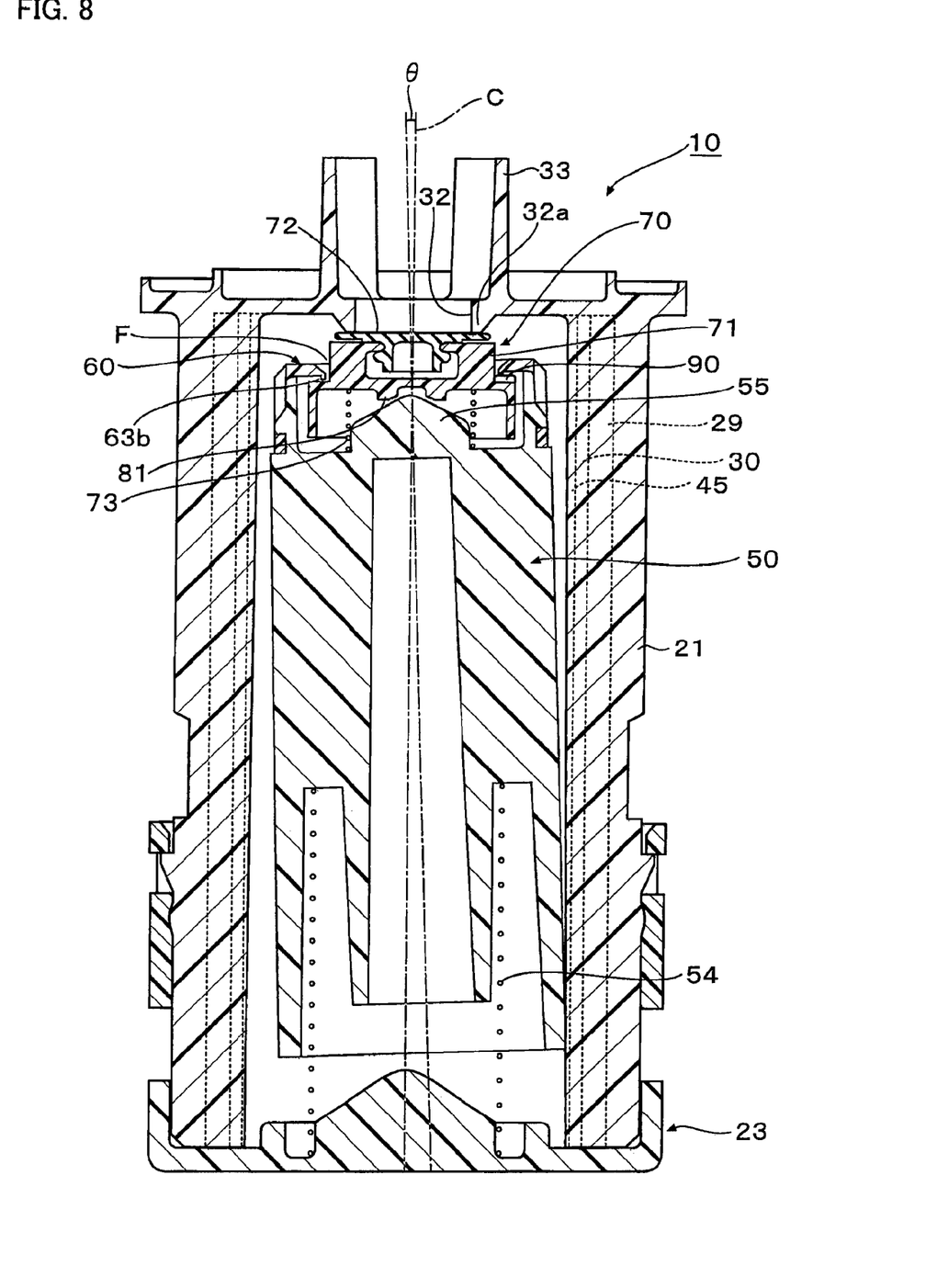
FIG. 8 is a sectional view of an entire device in the state as illustrated in FIG. 7.

At this stage, in the present invention, due to the provision of a circumferentially uneven protrusion 90 at the portion where the retention frame 60 and the movable valve 70 abut each other, as illustrated in FIGS. 7 and 8, the annular abutment portion 63b on the retention frame 60 side first abuts the protrusion 90 provided at the abutment portion on the movable valve 70 side, imparting a lowering force to the movable valve 70.

As a result, as illustrated in FIG. 7, a separation force F with respect to the valve seat 32a is imparted to the movable valve 70 through the intermediation of the retention frame 60. The separation force F is unevenly applied to a certain portion in circumferential direction of the movable valve 70, thereby applying to the corresponding portion with the valve seat 32a, and hence the separation force F is concentrated on that portion in circumferential direction, and thus the movable valve 70 is inclined to generate a gap between the movable valve 70 and the valve seat 32a. Once the gap is generated, the fuel vapor in the fuel tank escapes through that gap, and the inner pressure of the fuel tank is abruptly reduced. As a result, the movable valve 70 is quickly separated from the valve seat 32a, and descends together with the float 50.

Thus, even in a state in which the inner pressure of the fuel tank is relatively high and in which the pressure with which the movable valve 70 is pressed against the valve seat 32a is relatively high, it is possible to quickly separate the movable valve 70 from the valve seat 32a to open the valve when the fuel liquid level is lowered and the buoyancy of the float 50 becomes equal to or lower than a predetermined value, thus preventing the opening of the valve from being delayed to cause an increase abnormally in the inner pressure of the fuel tank.

It is noted that, as illustrated in FIG. 8, when the annular abutment portion 63b on the retention frame 60 side abuts the protrusion 90 provided on the abutment portion on the movable valve 70 side, solely the side opposite to the portion abutting the protrusion 90 in the float 50 and the retention frame 60 are lowered, and the float 50 tends to be inclined with respect to the axis of the valve seat 32a. However, the outer periphery of the lower end of the float 50 abuts the ribs 45 protruding from the inner surfaces of the inner walls 30 along which the vertical sliding of the float 50 is guided, and the inclination angle thereof is restricted, and hence there is no fear in that the float 50 is inclined by an angle larger than the maximum inclination angle θ. Further, as illustrated in FIG. 7, in this embodiment, even when the float 50 is inclined by the maximum inclination angle θ, the upper surface side outer periphery 74a of the movable valve 70 on the side opposite to the protrusion 90 does not abut the annular abutment portion 63b on the retention frame 60 side, and hence it is possible to maintain the state in which the separation force F is applied to a certain portion in circumferential direction.

Figure 9:
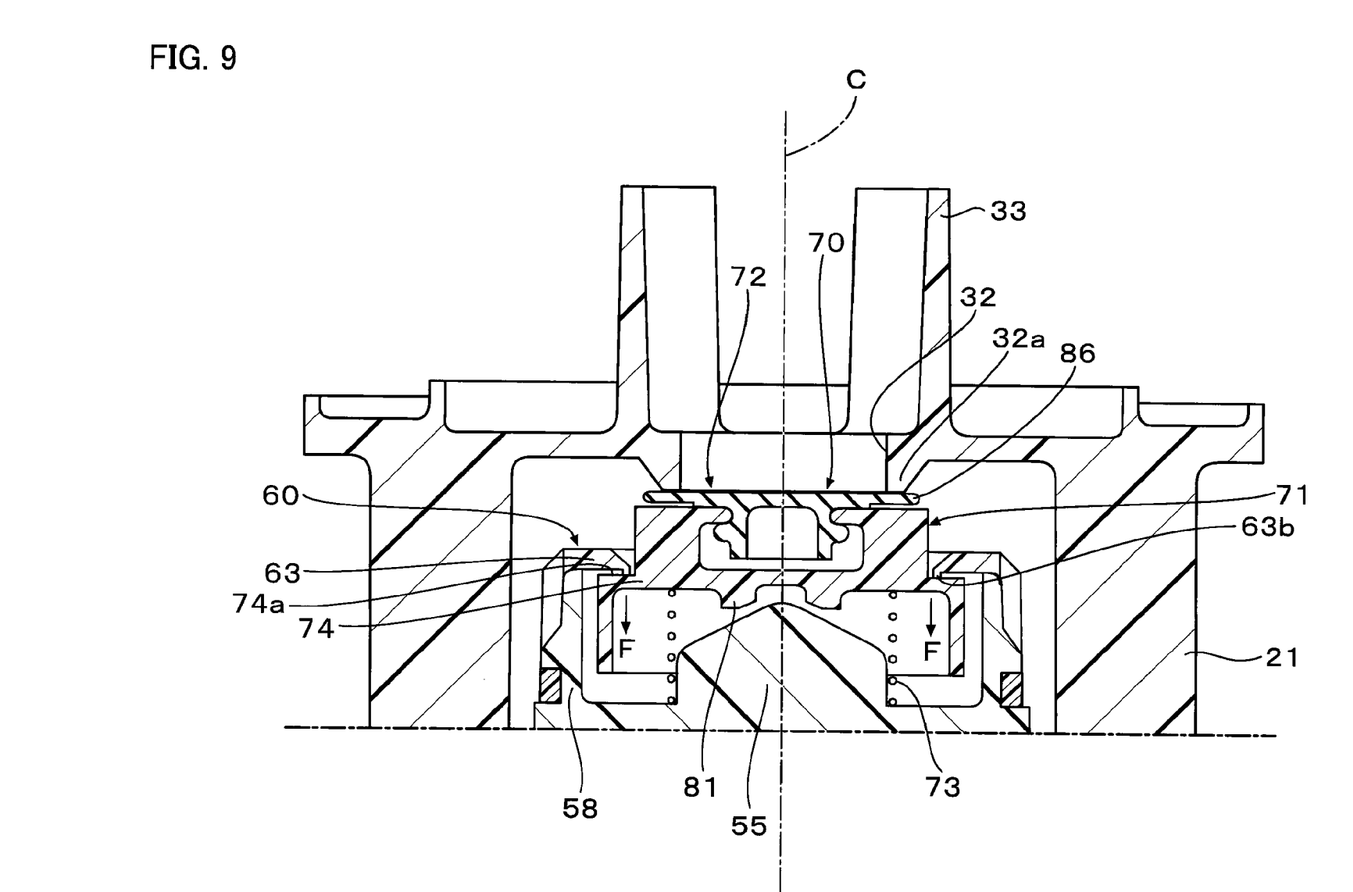
FIG. 9 is a partially enlarged sectional view illustrating how, in a float valve device in which no protrusion is provided between a retention frame and the movable valve, the float descends in the valve-closed state to separate the movable valve from the valve seat.

In this regard, a comparative example is described. FIG. 9 illustrates how the movable valve 70 and the retention frame 60 abut each other in the case in which no protrusion 90 is provided in the upper surface side outer periphery 74a of the movable valve 70, and FIG. 10 illustrates the attitude of the float 50 in the state as illustrated in FIG. 9.

As illustrated in FIG. 9, in the case in which no protrusion 90 is provided in the upper surface side outer periphery 74a of the movable valve 70, substantially the entire periphery of the upper surface side outer periphery 74a of the movable valve 70 abuts the annular abutment portion 63b on the retention frame 60 side, and hence the separation force F when the float 50 descends is applied uniformly to the entire periphery of the movable valve 70. Further, as illustrated in FIG. 10, as long as no other external force due to turning of the automobile or the like is applied to the float 50, the float 50 is supported without being inclined so with respect to the axis of the valve seat 32a. In this state, the separation force F for the movable valve 70 is dispersed, and it is necessary to separate the entire periphery thereof at once, and hence, when the inner pressure of the fuel tank is high, synergistically with the pressing force applied to the movable valve 70 due to the inner pressure with respect to the valve seat 32a, there is the fear of the movable valve 70 sticking to the valve seat 32a so as not to open the valve even when the fuel liquid level is lowered and there is no buoyancy for the float 50.

Figure 10:
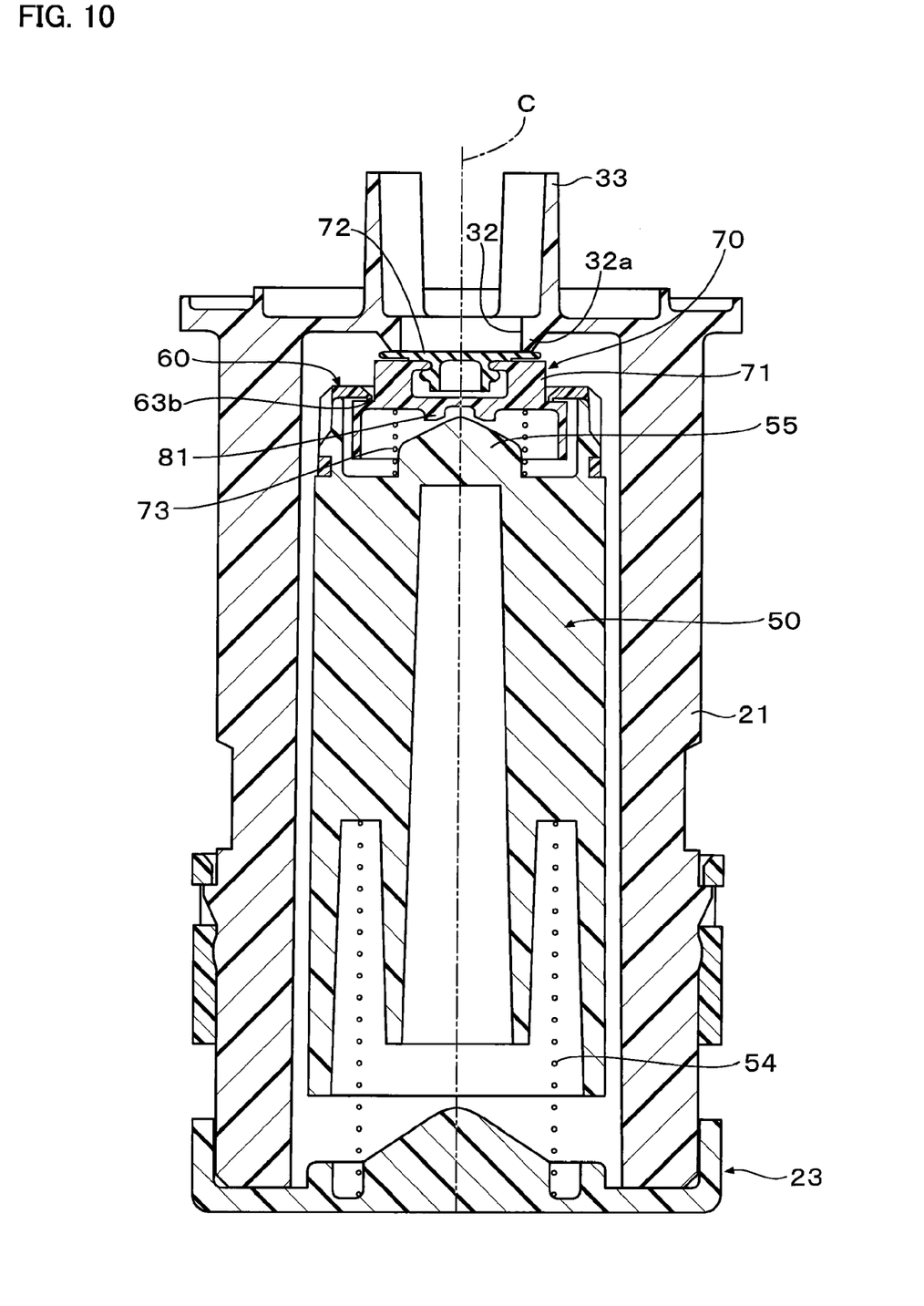
FIG. 10 is a sectional view of the entire device in the state as illustrated in FIG. 9.
Figure 11:
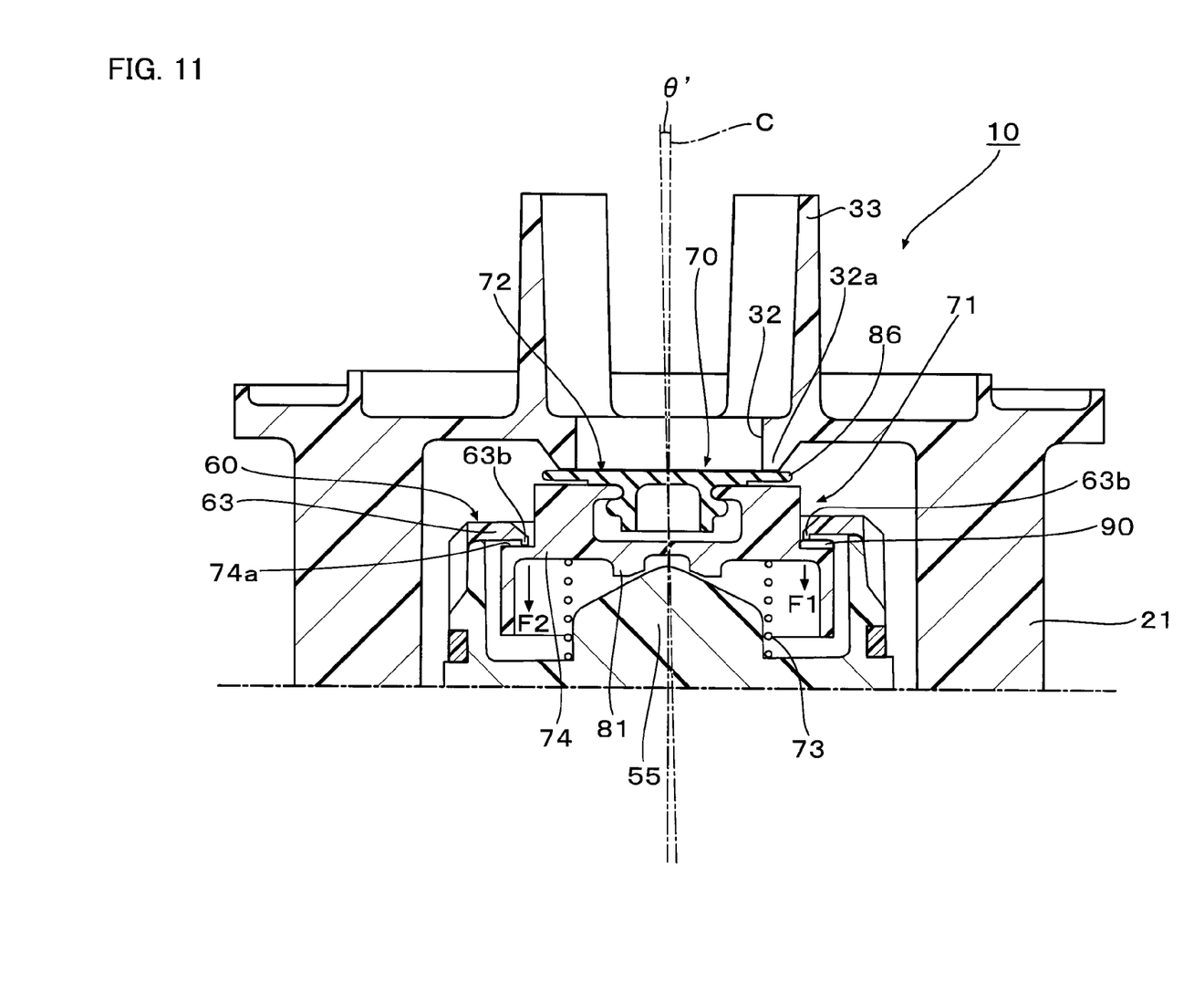
FIG. 11 is a partially enlarged sectional view illustrating how, in a float valve device according to the present invention in which while a protrusion is provided between the retention frame and the movable valve, the protrusion does not have a sufficient height, the float descends in the valve-closed state to separate the movable valve from the valve seat.
Figure 12:
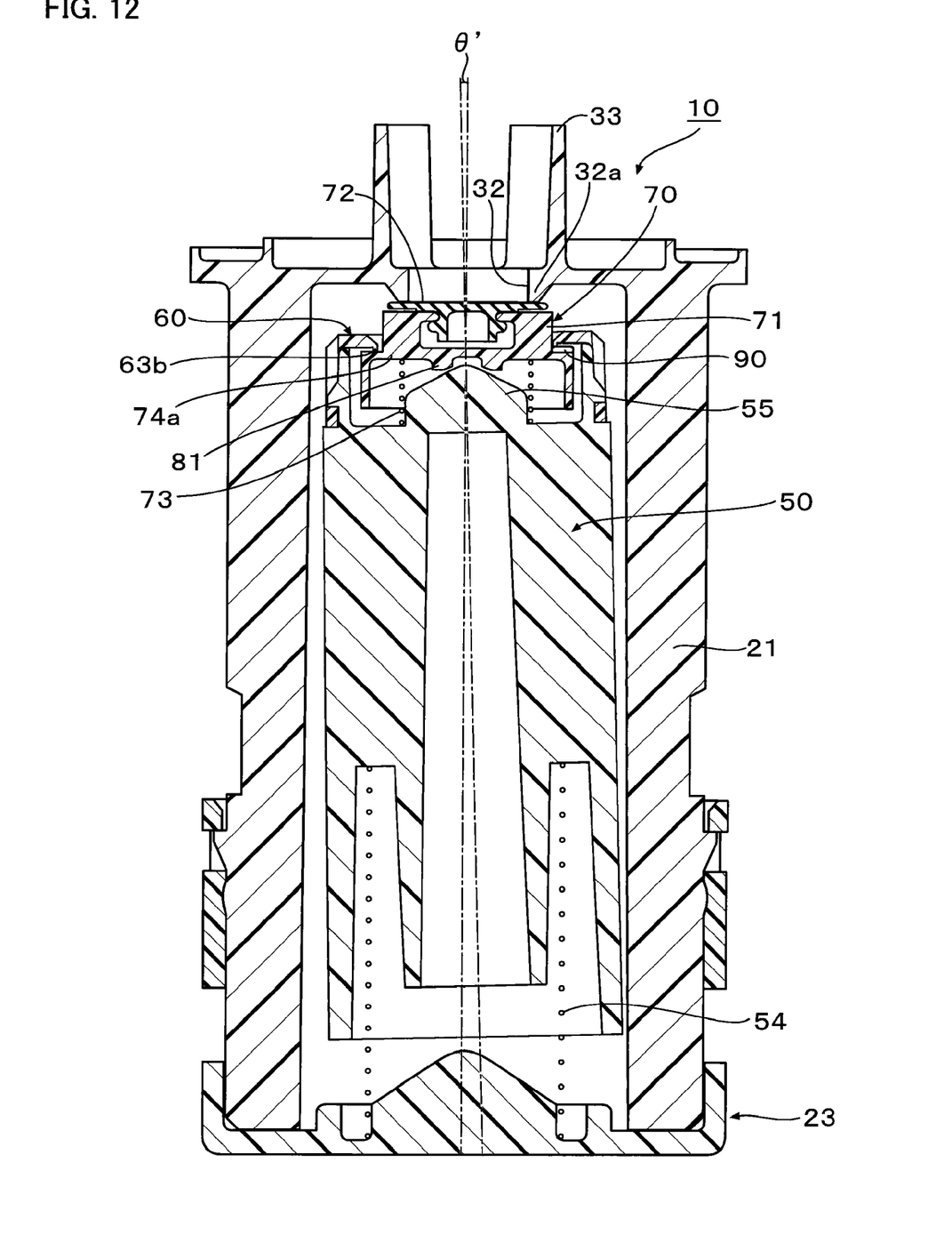
FIG. 12 is a sectional view of the entire device in the state as illustrated in FIG. 11.

FIG. 11 illustrates how the movable valve 70 and the retention frame 60 abut each other in a case in which, while the protrusion 90 is provided in the upper surface side outer periphery 74a of the movable valve, the height of the protrusion 90 is insufficient, and FIG. 12 illustrates the attitude of the float 50 in the state as illustrated in FIG. 10. In this embodiment, which is one of embodiment of the present invention, the valve is harder to open than in that the embodiment illustrated in FIGS. 1 through 7.

That is, even in a case in which the height of the protrusion 90 is insufficient, when the fuel liquid level is lowered and the float 50, which has been in the valve-closed state, descends, the annular abutment portion 63b on the retention frame 60 side first abuts the protrusion 90 provided on the abutment portion on the movable valve 70 side. Thus, at this point of stage, the separation force F1 is applied solely to the portion of the movable valve 70 in contact with the protrusion 90. When the pressure in the fuel tank is not so high, the portion of the movable valve 70 under the separation force F1 is separated from the valve seat 32a, thus making it possible to open the valve.

However, when the inner pressure of the fuel tank is high, and the pressing force applied to the movable valve 70 due to the inner pressure with respect to the valve seat 32a is large, the movable valve 70 may not be immediately separated from the valve seat 32a even when the separation force F1 is applied solely to the portion of the movable valve 70 in contact with the protrusion 90. In this case, solely the portion in the float 50 and the retention frame 60 on the side opposite to the portion in contact with the protrusion 90 descend, and the float 50 tends to be inclined with respect to the axis of the valve seat 32a.

When the height of the protrusion 90 is small, the portion of the annular abutment portion 63b of the retention frame 60 circumferentially opposed to the portion in contact with the protrusion 90 is also brought into contact with the upper surface side outer periphery 74a of the movable valve 70 before the float 50 is inclined to the maximum degree with respect to the axis of the valve seat 32a, that is, before the inclination angle θ' with respect to the axis of the valve seat 32a attains the maximum inclination angle θ (see FIGS. 7 and 8). As a result, the separation force F2 due to the load of the float 50 is also applied to the upper surface side outer periphery 74a opposed to the protrusion 90 of the movable valve 70, and the load of the float 50 is applied to two of circumferentially opposed portions of the movable valve 70 while divided into the separation forces F1 and F2, and hence there is the fear of the movable valve 70 not being smoothly separated from the valve seat 32a.

As such, by setting the height of the protrusion 90 such that the upper surface side outer periphery 74a of the movable valve 70 on the side opposite to the protrusion 90 does not abut the annular abutment portion 63b on the retention frame 60 side, the valve can be opened reliably and smoothly at the time of lowering of the fuel liquid level, even in a state in which the float 50 is inclined by the maximum inclination angle θ as in the embodiment illustrated in FIGS. 1 through 7.

In the above-mentioned embodiments the protrusion 90 is provided on the upper surface side of the outer periphery 74a of the plate portion 74, which is the abutment portion on the movable valve 70 side. Instead, it is also possible to provide a circumferentially uneven, partially protruding portion on the annular abutment portion 63b, which is the abutment portion on the retention frame 60 side, thereby using this as the protrusion of the present invention. Further, it is also possible to provide protrusions respectively on both abutment portions on the movable valve 70 side and the retention frame 60 side, causing the protrusions to abut each other. Further, while in the above-mentioned embodiments there is provided only one protrusion 90, it is also possible to provide a plurality of circumferentially uneven protrusions 90 such that the retention frame 60 can abut the movable valve 70 in a curcumferentially uneven manner.

What is claimed is:
1. A float valve device, comprising:
   a housing having a cylindrical shape in general, wherein the housing is divided into a lower space and an upper space by a partition wall, and wherein the housing comprises (i) a ventilation pipe mounted to an outer wall of the upper space, for allowing the upper space to com- municate with an exterior, (ii) an opening formed in the partition wall, (iii) a valve seat formed on a lower surface of the partition wall, (iv) and a communication hole formed in an outer wall of the lower space, for allowing the lower space to communicate with the exterior;

a float which is arranged in the lower space of the housing so as to be vertically slidable and adapted to be raised by a liquid flowing in through the communication hole of the housing;

a movable valve which is rockably supported on an upper portion of the float and which is adapted to abut the valve seat to close the opening when the float is raised to a predetermined height; and a retention frame which surrounds an outer periphery of the movable valve and which is attached to an outer periphery of the upper portion of the float to retain the movable valve and to allow the movable valve to ascend/descend by a predetermined distance and to incline with respect to the float, wherein the retention frame restricts an ascent/descent height of the of the movable valve with respect to the float, and a circumferentially uneven protrusion is formed on an abutment portion where the retention frame and the movable valve abut each other, wherein the protrusion is configured such that when the float descends in a valve-closed state, the retention frame and the movable valve first abut each other via the protrusion, and the protrusion imparts a lowering force to the movable valve, and wherein a height of the protrusion is set such that the retention frame and the movable valve abut each other solely via the protrusion even in a state in which the float is inclined to a maximum degree with respect to an axis of the valve seat.

2. The float valve device according to claim 1, wherein the protrusion is formed on the moveable valve.

3. The float valve device according to claim 2, wherein the protrusion is formed at a certain position in a circumferential direction on an upper surface side of the outer periphery of the movable valve, and wherein an outer periphery of the protrusion is formed as a curved surface of a predetermined curvature.

4. The float valve device according to claim 1, wherein a pair of inner walls with an arcuate cross-sectional configuration are arranged circumferentially opposed to each other in the lower space of the housing, the float is arranged at a center of a cylinder-axis of the housing, and a first gap is provided between the inner walls and the float, and wherein an annular rib that restricts lateral movement of the movable valve is provided inside the retention frame, the movable valve is arranged at the center of the cylinder-axis of the housing, and a second gap is provided between the annular rib and the movable valve.

* * * * *